（12） United States Patent
Kress

(10) Patent No.: US 11,611,254 B1
(45) Date of Patent: Mar. 21, 2023

(54) POWER GENERATION DEVICE AND A METHOD OF USE THEREOF

(71) Applicant: Nathan Kress, Sarasota, FL (US)

(72) Inventor: Nathan Kress, Sarasota, FL (US)

( * ) Notice: Subject to any disclaimer, the term of this patent is extended or adjusted under 35 U.S.C. 154(b) by 0 days.

(21) Appl. No.: 17/977,219

(22) Filed: Oct. 31, 2022

Related U.S. Application Data

(60) Provisional application No. 63/307,448, filed on Feb. 7, 2022, provisional application No. 63/303,969, filed on Jan. 27, 2022, provisional application No. 63/302,546, filed on Jan. 24, 2022.

(51) Int. Cl.
*H02K 3/04* (2006.01)
*H02K 11/30* (2016.01)
*H02K 41/00* (2006.01)

(52) U.S. Cl.
CPC ............ *H02K 3/04* (2013.01); *H02K 11/30* (2016.01); *H02K 41/00* (2013.01)

(58) Field of Classification Search
CPC . H02K 3/00; H02K 3/04; H02K 11/00; H02K 11/30; H02K 41/00
USPC .................................................. 310/68 R, 71
See application file for complete search history.

(56) References Cited

U.S. PATENT DOCUMENTS

| | | | | |
|---|---|---|---|---|
| 5,475,277 A | * | 12/1995 | Johnson | H02P 6/08 310/156.19 |
| 5,731,649 A | * | 3/1998 | Caamano | H02K 1/02 310/43 |
| 5,982,070 A | * | 11/1999 | Caamano | H02K 1/185 310/43 |
| 2006/0207871 A1 | * | 9/2006 | Yumshtyk | H01J 37/3458 204/192.1 |
| 2007/0120634 A1 | * | 5/2007 | Mehdizadeh | H01F 27/363 336/120 |
| 2008/0024044 A1 | * | 1/2008 | Palmer | H02K 99/20 310/68 R |
| 2013/0335086 A1 | * | 12/2013 | Shah | G01R 33/34007 216/22 |
| 2014/0234139 A1 | * | 8/2014 | Sakawaki | F04D 29/059 310/90.5 |
| 2017/0038165 A1 | * | 2/2017 | Barron | H01F 7/20 |
| 2017/0038166 A1 | * | 2/2017 | Barron | F28F 13/00 |
| 2021/0099066 A1 | * | 4/2021 | Hartman | B65G 23/23 |
| 2021/0175003 A1 | * | 6/2021 | Vitry | H02K 44/06 |
| 2021/0263090 A1 | * | 8/2021 | Everroad | G01R 33/0023 |
| 2021/0376708 A1 | * | 12/2021 | De Benedictis | H02K 41/031 |
| 2022/0046767 A1 | * | 2/2022 | Seguí Díaz-Pache | F24H 9/0021 |
| 2022/0102119 A1 | * | 3/2022 | Jung | H01J 37/32669 |
| 2022/0240587 A1 | * | 8/2022 | Courbat | H05B 6/105 |
| 2022/0354177 A1 | * | 11/2022 | Courbat | A24F 40/53 |

(Continued)

*Primary Examiner* — Rashad H Johnson
(74) *Attorney, Agent, or Firm* — Barry Choobin; Patent 360

(57) ABSTRACT

A device for generating power from an input power supply, wherein a net power is generated. The device includes multiple electromagnets arranged in a series to form a row. The row of electromagnets is encased in a tubular coil. Each of the electromagnets is electrically coupled to the controller such that the controller can power the electromagnets one by one in a predefined order at a predetermined switching frequency. A common magnetic field is generated from consecutive powering of the electromagnets based on the switching frequency, wherein changing common magnetic field causes inductance currents in the coil.

20 Claims, 5 Drawing Sheets

(56) References Cited

U.S. PATENT DOCUMENTS

2022/0354182 A1* 11/2022 Courbat .................. A24F 40/57
2022/0386704 A1* 12/2022 Courbat ................. H05B 6/105

* cited by examiner

POWER GENERATION DEVICE AND A METHOD OF USE THEREOF

CROSS-REFERENCE TO RELATED APPLICATIONS

This application claims priority from a U.S. Provisional Patent Appl. No. 63/303,969 filed on Jan. 27, 2022, this application also claims priority from a U.S. Provisional Patent Appl. No. 63/302,546 filed on Jan. 24, 2022, this application also claims priority from a U.S. Provisional Patent Appl. No. 63/307,448 filed on Feb. 7, 2022, all of the above three applications are incorporated herein by reference in its entirety

FIELD OF INVENTION

The present invention relates to a power generation device, more particularly, the present invention relates to a device for generating power using electromagnets which produce changing and moving magnetic field.

BACKGROUND

Electricity is essential in the modern world, wherein most of the activities in day-to-day life depend upon electricity. Besides domestic needs, electricity is essential for industrial growth as well. Without electricity, the world appears as if it would come to a standstill. The electricity demand is more than its production. Much of the electricity is produced from fossil fuels which are limited in availability and likely to get exhausted in near future. The cost of producing the electricity is increasing due to more demand and the rising cost of fossil fuels.

A need is therefore appreciated for a novel apparatus for generating electricity.

The terms electricity and power are interchangeably used hereinafter.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a device for generating power using power as an input, wherein the net output is more.

It is another object of the present invention that the net efficiency of power generation is improved.

It is still another object of the present invention that increased efficiency results in lesser carbon emissions.

It is yet another object of the present invention that the cost of energy production can be reduced.

It is a further object of the present invention that the device can be adapted for large scale operation.

It is still a further object of the present invention that the device can be used at both small and large scales.

In one aspect, disclosed is a device and method of use thereof to generate electricity. The device includes a plurality of electromagnets arranged in a series to form a row; a tubular coil encasing the row; and a controller, wherein each of the plurality of electromagnets is electrically coupled to the controller, wherein the plurality of electromagnets is electrically insulated from each other, wherein the controller is configured to power the plurality of electromagnets one by one, or two at one time in a predefined order. The controller is configured to power the plurality of electromagnets in a sequence from left to right and then right to left. The controller is configured to power only one or two electromagnets of the plurality of electromagnets at one time. A switching frequency of the controller for switching from a one electromagnet to another electromagnet in the row is such that a magnetic field of the first electromagnet blends with a magnetic field generated by the second electromagnet to form a common magnetic field. The common magnetic field causes generation of electricity in the tubular coil. The tubular coil is configured to electrically connect to a load for supplying the generated electricity to the load. An amount of electricity generated in the tubular coil in a given time is more than an amount of the electricity used to power the plurality of electromagnets in that given time. The plurality of electromagnets comprises 500-1500 electromagnets. The controller is electrically coupled to a power supply unit for drawing input power, the input power is for powering the plurality of electromagnets.

In one implementation, the controller is configured to turn on and off the electromagnets consecutively and linearly in the row in a pre-defined sequence. In one case, the sequence can be left to right in the row i.e., restarting a cycle from the first electromagnet in a row to the last electromagnet in the row repeatedly. In another case, the sequence can be from right to left in the row i.e., restarting a cycle from the last electromagnet in a row to the first electromagnet in the row repeatedly. Still, in another case, the sequence can be reversed after n cycles. For example, the left to right three cycles can be followed by right to left three cycles, then left to right three cycles, and so on.

In one implementation, at one time, only a set of electromagnets can be on. Another set of electromagnets can be turned on consecutively after turning off the previous set of electromagnets. The set of electromagnets can be one electromagnet, a pair of electromagnets, or more than two electromagnets. Preferably, the set of electromagnets can be one electromagnet or a pair of electromagnets. The set of electromagnets can be together i.e., one after another. Alternately, the set of electromagnets can be spaced apart by one or more electromagnets. For example, first and third, second and fourth, thirds and fifth, and so on electromagnets in a row of magnets can form pairs. In one case, a row having n number of electromagnets and three magnets forming a set of electromagnets, a first set of electromagnets include a first, (n/3+1), and (2n/3+1) electromagnets. A second set of electromagnets includes a second, (n/3+2), and (2n/3+2) electromagnets. The controller causes switching from the first set of electromagnets to the second set of electromagnets i.e., the first set of electromagnets can be turned on, and then off, and then consecutively, the second set of electromagnets can be turned on.

In one aspect, the controller is configured to consecutively switch from one set of electromagnets to another set of electromagnets based on a predetermined switching frequency. The switching frequency is turning a set of electromagnets on, keeping the set of electromagnets on for a predefined duration, then turning off the set of electromagnets and then turning on another set of electromagnets within a predefined duration. Only one set of electromagnets can be on at one time.

In one implementation, the consecutive switching of electromagnets one after another in a row based on the pre-defined switching frequency leads to a changing and moving magnetic field that can induce inductance currents in the coil, wherein the output power generated is more than the input power for powering the electromagnets.

In one implementation, the sequence can be optional in switching the electromagnets. The controller can turn on any random electromagnet in the row of electromagnets.

In one aspect, the electromagnets can be arranged radially, and the coil can be in the form of a wire frame armature. The coil can be around the radial electromagnets. Alternatively, the coil can pass through the radially arranged electromagnets.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
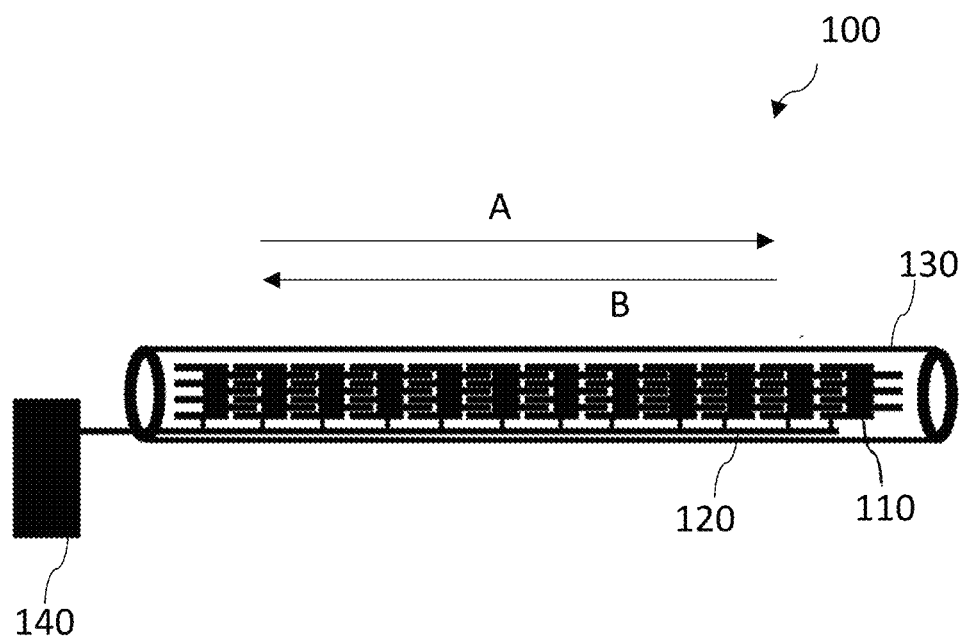
FIG. 1 is a schematic view of the device, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be outlined to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Disclosed is a device for generating power using power as input wherein the net power generated is more than the input power, thus improving an overall power generation efficiency.

Figure 2:
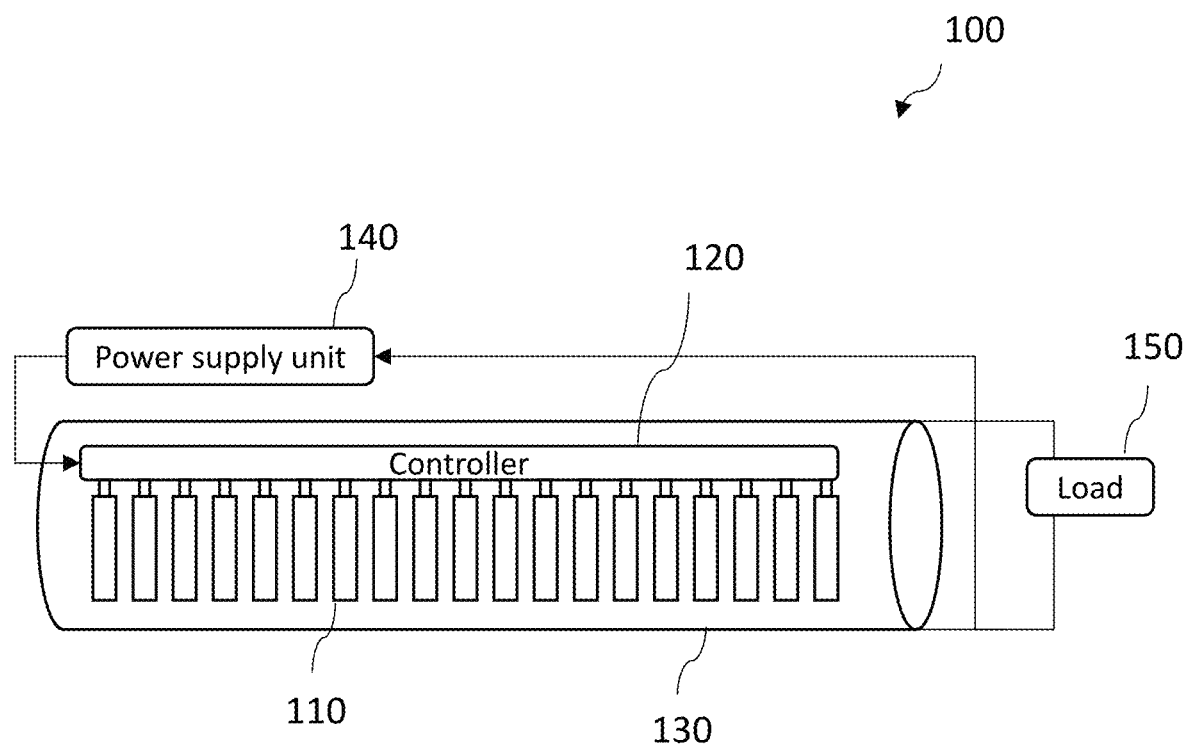
FIG. 2 is a block diagram of the device, according to an exemplary embodiment of the present invention.

Referring to FIGS. 1 and 2 wherein FIG. 1 is a schematic diagram of an exemplary embodiment of the disclosed device 100 and FIG. 2 is a block diagram thereof. The device includes multiple electromagnets 110 arranged in series one after another to form a row. The row of electromagnets can be encased in an elongated tubular coil 130. A controller 120 can power each electromagnet in the row one at a time in a sequence from left to right and then right to left. Controller 120 can be connected to a power supply unit 140 that supplies input power for powering the electromagnets. The power can be switched from a first electromagnet to the next or adjacent electromagnet in the sequence such that no two electromagnets are powered at the same time, and the magnetic field generated by the first electromagnet does not lapse but gets blended with the magnetic field generated by the second electromagnet. Overall, the magnetic fields of individual electromagnets can blend into a common magnetic field and the common magnetic field can move in the direction of sequence in which the electromagnets are powered. Arrows A and B show the directions from left to right and then right to left. The coil 130 can receive the changes in the magnetic field of the electromagnets through electromagnetic induction. The coil can have two terminals for connecting to a load 150 for supplying power to the load. A portion of the power generated by the device can be supplied to the power supply unit (as shown in FIG. 2) and thus the device can be powered by its power. Alternatively, the operation of power output from the first row can power another such row or another device to continue providing more electricity.

The above embodiment describes powering the row of electromagnets from left to length and right to left in a predefined sequence by the controller, also referred to herein as switching the electromagnets, however, the controller can power the row in a single direction only i.e., left to right only or right to left only, without departing from the scope of the present invention.

In one implementation, the switching frequency for switching from the first electromagnet to the second electromagnet can be determined by the controller automatically.

In one implementation, the size and capacity of the electromagnets can vary without departing from the scope of the present invention.

The controller/switch can include a suitable microprocessor and a memory. The memory can include suitable instructions for powering the electromagnets in sequence.

In one implementation, a set number of electromagnets can be placed inside a copper wire coil in a series of tightly packed arrangements. Each magnet is individually connected to the common power source and the switch. For example, 1000 electromagnets identified as magnets #1, #2, #3, and so on are packed in a coil. These magnets are placed in a single file and are close together, so their magnet fields blend into the previous and the next one in line.

The process involves introducing electricity simultaneously to two magnets that are in sequential order, such as magnets #1 and #2. Then, power is turned off from magnet #1 and applied to magnet #3. This is immediately followed by power being turned off on magnet #2 and applied to magnet #4. This is repeated in sequential order until magnets #999 and #1000 are powered on. At that time, magnet #1000 is turned off and magnet #998 is activated and the sequence is reversed until the magnet #1 can be powered. Once this full cycle is completed, the process begins again. This movement back and forth inside the coil would make a sine wave of AC electricity. The movement back and forth of electromagnets could be changed to go one direction making DC power. The placement of each electromagnet and the application of electricity is done in such a smooth and continuous manner that the magnetic field from one electromagnet blends into the adjoining electromagnet and an electromagnetic field wave is established. This will create a level of power that is greater than the power needed to generate the magnetic field moving wave.

A portion of the excess power can be supplied to the common power source; thus, the disclosed system can be self-powered to a certain extent and rely less on an external power source.

In another implementation, the disclosed system can use a single electromagnet and have the power source turn on and off, in rapid succession at a predetermined frequency, creating its own electromagnet field with an output greater than the initial power input.

In one implementation, a long string of magnets that are spaced further apart from each other. Each one is individually connected to a power source. Power is then applied in a scattered fashion to one magnet at a time or multiple magnets at one time.

Above embodiment describe electromagnets powered in a predetermined sequence, however, random on/off electromagnets and single electromagnets on/off are within the scope of the present invention. Also, the above embodiments describe a common electromagnetic field formed by blending of individual electromagnetic fields, however, detached, or isolated magnetic fields are also within the scope of the present invention.

In one implementation, turning on/off the magnetic field itself pulls electrons in the copper wire. This motion is caused by there not being a magnetic field to start with and there being a displacement of electrons towards a single direction when it is switched on. The random picking of electromagnets can work towards a single direction by having the electromagnet itself tend to displace electrons toward a single direction unique to that electromagnet when it is turned on. This whole thing can mean that detached magnetic fields and a random selection of electromagnets being turned on and off and switching a single electromagnet on and off many times can work similarly to the blending of the magnetic fields as discussed above.

In one implementation, the magnetic field keeps blending with the previous magnetic fields and after it completes a full run through the whole row of electromagnets, it then starts back at the first electromagnet and repeats the same direction many times before it switches the direction to create the two directions of alternating current. The process can be repeated many times at the same moment as the first moment. So, to have like five motions of magnetic fields running one behind the other simultaneously before it switches the direction the opposite way and doing the five motions in the other direction.

In one implementation, the electromagnets in a row can be arranged in a spinning circle motion around the coil in the center. Such an arrangement can be particularly suitable for DC and AC generators instead of a long straight coil.

In one implementation, DC power can be generated by switching the electromagnets in a straight row and in the direction from left to right and looping again from left to right.

Figure 3:
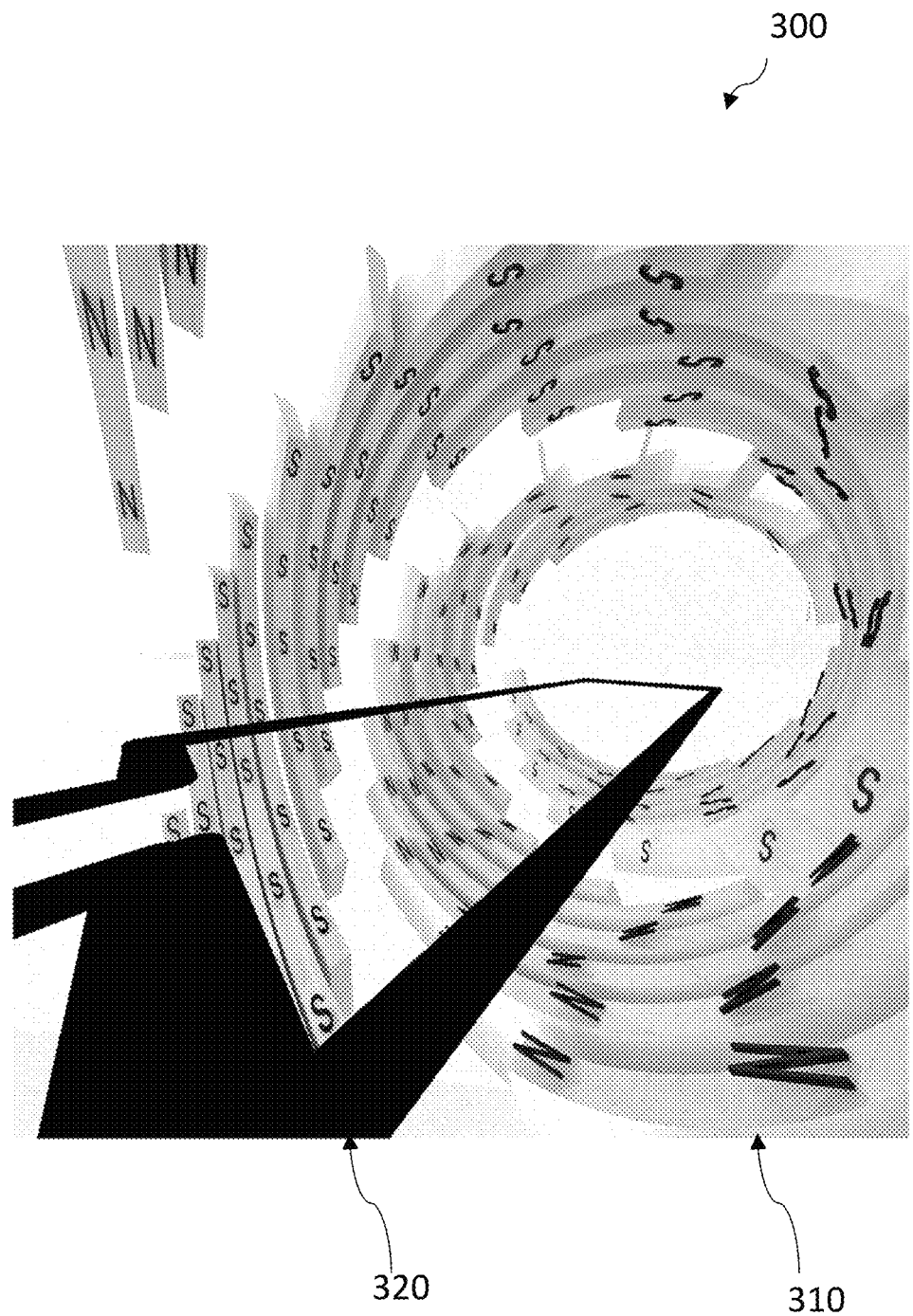
FIG. 3 shows another embodiment of the device that has radial electromagnets, according to the present invention.
Figure 4:
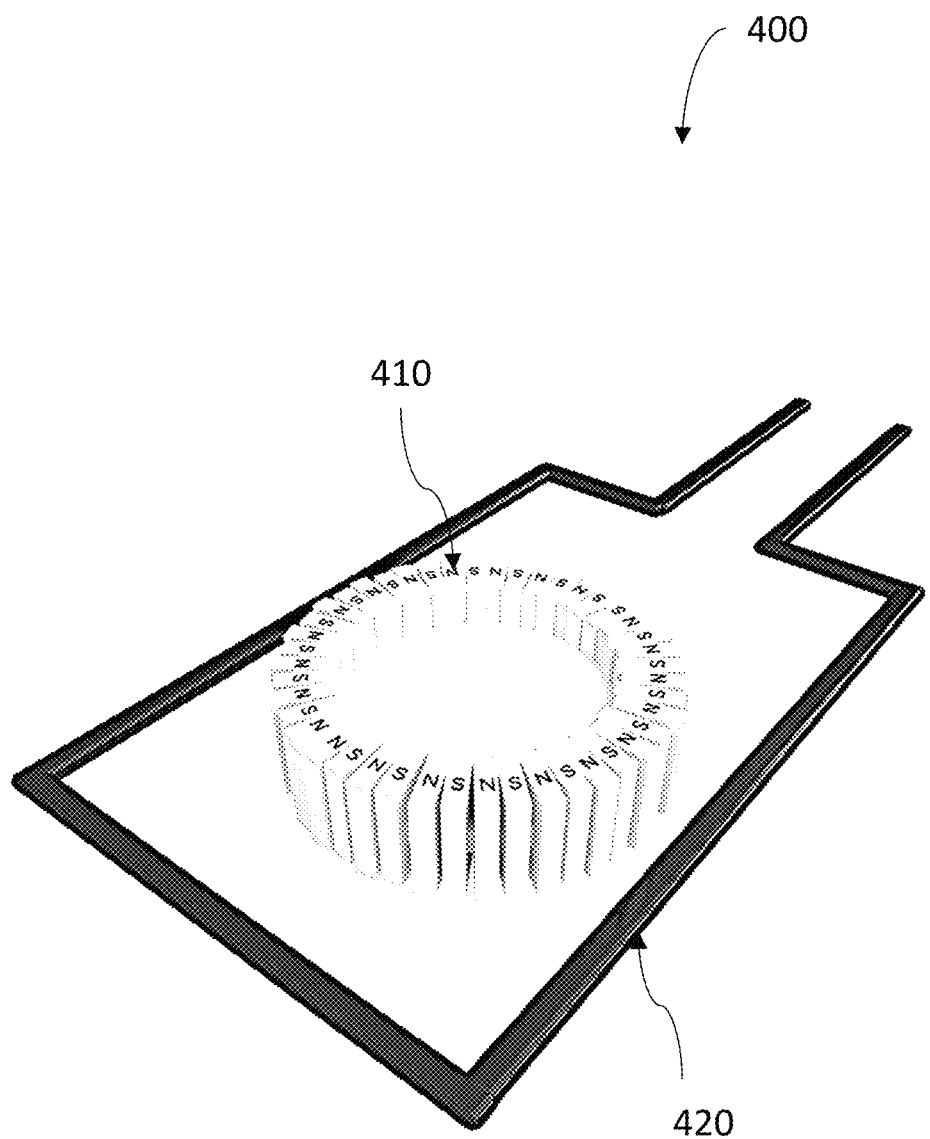
FIG. 4 shows another embodiment of the device that has radial electromagnets, according to the present invention.
Figure 5:
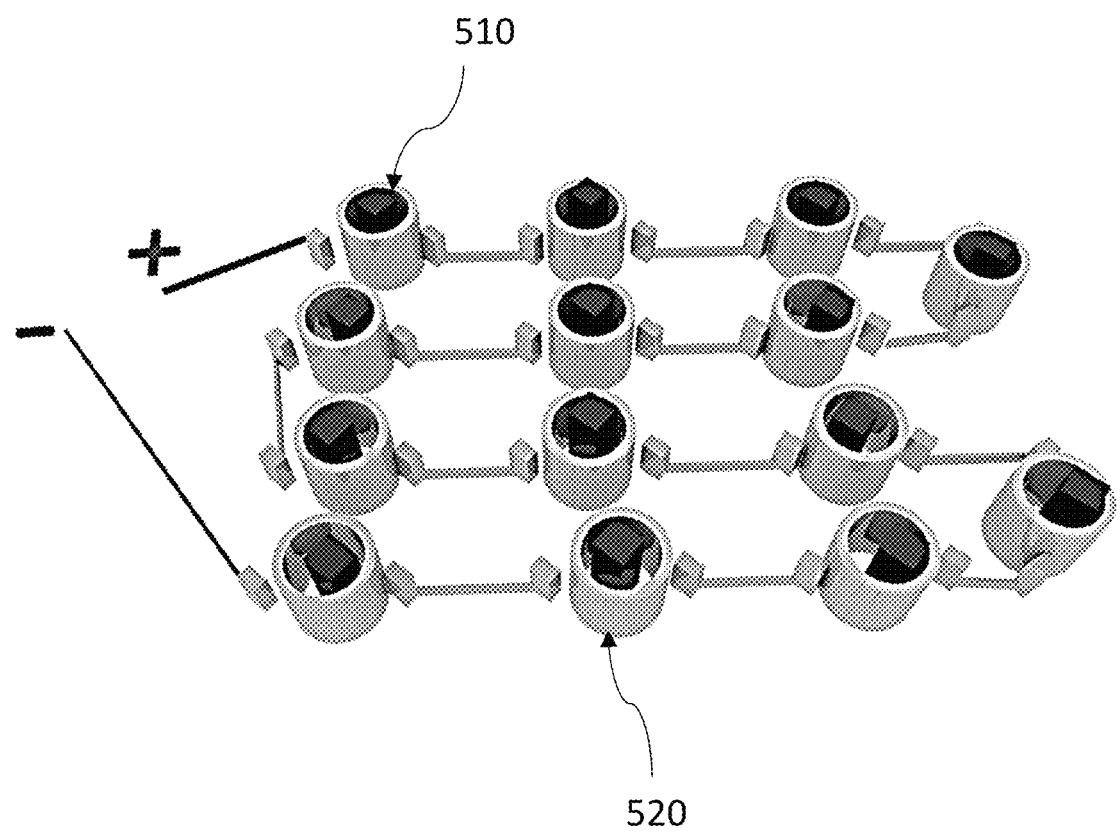
FIG. 5 shows another embodiment of the device, according to the present invention

In one implementation, the device can include north and south pole circle electromagnets arranged in a circle such that going down the line, they are slightly rotated in the circle to create the effect of a spinning motion with electromagnets. Such an effect is shown in FIGS. 3 and 5, which show how the electromagnets are arranged side-by-side and the two sides of the magnetic field get rotated with each one shown with a blank space representing the north and south pole sides of the circle. Turning the electromagnets on in sequential order to mirror the previous magnetic field and random choosing of electromagnets in the spinning circle can be similar to the magnetic field generated by the row of electromagnets. The coil is shown in the form of a wireframe armature. FIG. 3 shows a device 300 having radial electromagnets 310 and an armature coil 320 passing through the radial magnets row. FIG. 4 shows a device 400 that has radial magnets 410 encased with the wireframe armature coil 420. FIG. 5 shows another embodiment of the device having tubular coils 520 that are interconnected to each other and each encasing an electromagnet 510.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A device for generating power comprises:
   a plurality of electromagnets arranged in a series to form a row;
   a tubular coil encasing the row; and
   a controller, wherein each of the plurality of electromagnets is electrically coupled to the controller, wherein the plurality of electromagnets are electrically insulated from each other, wherein the controller is configured to turn on and off each of the plurality of electromagnets, the controller is configured to turn on and off the plurality of electromagnets consecutively in a predefined order resulting in a changing and moving magnetic field.

2. The device according to claim 1, wherein the controller is configured to turn on and off the plurality of electromagnets consecutively and linearly in a sequence from left to right and then right to left.

3. The device according to claim 2, wherein the controller is configured to turn on two electromagnets of the plurality of electromagnets at one time, wherein only two electromagnets of the plurality of electromagnets is on at one time.

4. The device according to claim 2, wherein the controller is configured to turn on one electromagnet of the plurality of electromagnets at one time, wherein only one electromagnet of the plurality of electromagnets is on at one time.

5. The device according to claim 4, wherein a switching frequency of the controller for causing switching of the electromagnets from one electromagnet to another electromagnet in the row is such that a magnetic field of an electromagnet of the plurality of electromagnets blends with a magnetic field generated by the subsequent electromagnet in the row to form a common magnetic field.

6. The device according to claim 5, wherein the common magnetic field causes generation of electricity in the tubular coil.

7. The device according to claim 6, wherein the tubular coil is configured to electrically connect to a load for supplying the generated electricity to the load.

8. The device according to claim 6, wherein an amount of electricity generated in the tubular coil in a given time is more than an amount of the electricity used to power the plurality of electromagnets in that given time.

9. A method for generating electricity, the method comprises:
providing a device comprising:
a plurality of electromagnets arranged in a series to form a row,
a tubular coil encasing the row, and
a controller, wherein each of the plurality of electromagnets is electrically coupled to the controller, wherein the plurality of electromagnets are electrically insulated from each other, wherein the controller is configured to turn on and off each of the plurality of electromagnets, the controller is configured to turn on and off the plurality of electromagnets consecutively in a predefined order resulting in a changing and moving magnetic field.

10. The method according to claim 9, wherein the controller is configured to turn on and off the plurality of electromagnets consecutively and linearly in a sequence from left to right and then right to left.

11. The method according to claim 10, wherein the controller is configured to turn on one electromagnet of the plurality of electromagnets at one time, wherein only one electromagnet of the plurality of electromagnets is on at one time.

12. The method according to claim 11, wherein a switching frequency of the controller for causing switching of the electromagnets from one electromagnet to another electromagnet in the row is such that a magnetic field of an electromagnet of the plurality of electromagnets blends with a magnetic field generated by the subsequent electromagnet in the row to form a common magnetic field.

13. The method according to claim 12, wherein the common magnetic field causes generation of electricity in the tubular coil.

14. The method according to claim 13, wherein the tubular coil is configured to electrically connect to a load for supplying the generated electricity to the load.

15. The method according to claim 13, wherein an amount of electricity generated in the tubular coil in a given time is more than an amount of the electricity used to power the plurality of electromagnets in that given time.

16. A device for generating power, the device comprises:
a first set of electromagnets and a second set of electromagnets arranged in a row;
a coil encasing the row; and
a controller, the controller is configured to consecutively turn on and off the first set of electromagnets and the second set of electromagnets, wherein only one set of electromagnets is on at one time, wherein the controller is configured to cause switching from the first set of electromagnets to the second set of electromagnets based on a pre-defined switching frequency, wherein the consecutive turning on and off results in generation of inductance current in the coil.

17. The device according to claim 16, wherein the row comprises more than two sets of electromagnets, wherein each set of electromagnets has one or more electromagnets, wherein the second set of electromagnets is adjacent to the first set of electromagnets, the controller is configured to cause switching consecutively and linearly in a sequence from one set of electromagnets to adjacent set of electromagnets in the row.

18. The device according to claim 16, wherein the row comprises more than two sets of electromagnets, wherein each set of electromagnets has one or more electromagnets, wherein the second set of electromagnets is randomly positioned relative the first set of electromagnets, the controller is configured to cause random switching from one set of electromagnets to another set of electromagnets in the row.

19. The device according to claim 16, wherein the electromagnets are radially arranged in the row and the coil comprises an armature.

20. The device according to claim 16, wherein the row comprises n number of electromagnets, the first set of electromagnets comprises a first, $(n/3+1)^{th}$, and $(2n/3+1)^{th}$ electromagnets in the row, and the second set of electromagnets comprises a second, $(n/3+2)^{th}$, and $(2n/3+2)^{th}$ electromagnets in the row, wherein the controller is configured to cause switching consecutively and linearly in a sequence.

* * * * *